(12) United States Patent
Xu et al.

(10) Patent No.: US 12,125,208 B2
(45) Date of Patent: Oct. 22, 2024

(54) METHOD AND ARRANGEMENT FOR AUTOMATICALLY LOCALIZING ORGAN SEGMENTS IN A THREE-DIMENSIONAL IMAGE

(71) Applicant: SIEMENS HEALTHINEERS AG, Forchheim (DE)

(72) Inventors: Zhoubing Xu, Plainsboro, NJ (US); Sasa Grbic, Plainsboro, NJ (US); Dominik Neumann, Erlangen (DE); Guillaume Chabin, Paris (FR); Bruce Spottiswoode, Knoxville, TN (US); Fei Gao, Knoxville, TN (US); Günther Platsch, Röthenbach (DE)

(73) Assignee: Siemens Healthineers AG, Forchheim (DE)

( * ) Notice: Subject to any disclaimer, the term of this patent is extended or adjusted under 35 U.S.C. 154(b) by 439 days.

(21) Appl. No.: 17/446,732

(22) Filed: Sep. 2, 2021

(65) Prior Publication Data

US 2022/0092786 A1   Mar. 24, 2022

(30) Foreign Application Priority Data

Sep. 23, 2020   (DE) ...................... 10 2020 211 945.7

(51) Int. Cl.
   *G06T 7/11*    (2017.01)
   *G06T 7/00*    (2017.01)
   *G06T 7/187*   (2017.01)

(52) U.S. Cl.
   CPC .............. *G06T 7/11* (2017.01); *G06T 7/0012* (2013.01); *G06T 7/187* (2017.01);
   (Continued)

(58) Field of Classification Search
   None
   See application file for complete search history.

(56) References Cited

U.S. PATENT DOCUMENTS

| 7,996,060 B2 | 8/2011 | Trofimov et al. |
| 10,991,460 B2 | 4/2021 | Annavi et al. |

(Continued)

FOREIGN PATENT DOCUMENTS

| CN | 101229080 A | 7/2008 |
| CN | 102402796 A | 4/2012 |

(Continued)

OTHER PUBLICATIONS

Irving et al., "3D segmentation of the airway tree using a morphology based method," 2009, Proceedings of 2nd International Workshop on Pulmonary Image Analysis, pp. 297-307.
Feuerstein et al., "Adaptive Branch Tracing and Image Sharpening for Airway Tree Extraction in 3-D Chest CT," 2009, Proceedings of 2nd International Workshop on Pulmonary Image Analysis, p. 9. 273-284.

(Continued)

*Primary Examiner* — Tahmina N Ansari (57) ABSTRACT

The invention describes a method for automatically localizing organ segments in a three-dimensional image comprising the following steps: providing a three-dimensional image showing at least one organ and at least one tubular network comprising a plurality of tubular structures, the organ comprising organ segments; performing automatic separation of the organ from other parts of the image; performing automatic tracing of the tubular network to obtain a branch map; performing automatic analysis of the branch map to identify specific tubular structures; performing automatically assigning regions of the organ to the specific tubular structures to segment the organ into localized organ segments; and outputting the localized organ segments and the traced and analyzed tubular network as image data. The invention further describes a localization arrangement and a medical imaging system.

16 Claims, 7 Drawing Sheets

(52) U.S. Cl.
CPC .............. *G06T 2207/10081* (2013.01); *G06T 2207/10088* (2013.01); *G06T 2207/10136* (2013.01); *G06T 2207/20081* (2013.01); *G06T 2207/30016* (2013.01); *G06T 2207/30056* (2013.01); *G06T 2207/30061* (2013.01); *G06T 2207/30101* (2013.01)

(56) References Cited

U.S. PATENT DOCUMENTS

| | | | | |
|---|---|---|---|---|
| 2008/0094389 | A1* | 4/2008 | Rouet | G06T 7/149 345/419 |
| 2016/0110874 | A1* | 4/2016 | Matthews | G06T 7/174 382/131 |
| 2020/0020435 | A1* | 1/2020 | Annavi | G06T 7/0012 |
| 2022/0092786 | A1* | 3/2022 | Xu | G06T 7/187 |

FOREIGN PATENT DOCUMENTS

| | | |
|---|---|---|
| CN | 102646266 A | 8/2012 |
| CN | 109620404 A | 4/2019 |
| CN | 110717487 A | 1/2020 |
| CN | 111311583 A | 6/2020 |
| EP | 1447772 A1 | 8/2004 |
| EP | 3872755 A1 | 9/2021 |

OTHER PUBLICATIONS

Lo et al., "Multiscale Vessel-guided Airway Tree Segmentation," 2009, Proceedings of 2nd International Workshop on Pulmonary Image Analysis, pp. 323-332.

Bauer et al., "Airway Tree Reconstruction Based on Tube Detection," 2009, Proceedings of 2nd International Workshop on Pulmonary Image Analysis, pp. 203-213.

Liu et al., "Automated 3-D Neuron Tracing With Precise Branch Erasing and Confidence Controlled Back Tracking," 2008. IEEE Transactions on Medical Imaging, vol. 37, No. 11, pp. 2441-2452.

Çiçek et al., "3D U-Net: Learning Dense Volumetric Segmentation from Sparse Annotation," 2016, MICCAI, Springer, vol. 9901, pp. 424-432.

Busayarat et al., "Detection of Bronchopulmonary Segments on High-Resolution CT—Preliminary Results," 2007, In Twentieth IEEE International Symposium on Computer-Based Medical Systems (CBMS'07), pp. 199-204.

Rikxoort et al., "Automatic segmentation of pulmonary segments from volumetric chest CT scans," 2009, IEEE transactions on medical imaging, vol. 28, No. 4, pp. 621-630.

Liu et al., "Rivulet: 3d neuron morphology tracing with iterative back-tracking." 2016, Neuroinformatics vol. 14, No. 4, pp. 387-401.

Wikipedia: "Medical Image Computing"; URL: https://web.archive.org/web/20200619174420if_/https://en.wikipedia.org/wiki/Medical_image_computing.

* cited by examiner

METHOD AND ARRANGEMENT FOR AUTOMATICALLY LOCALIZING ORGAN SEGMENTS IN A THREE-DIMENSIONAL IMAGE

This application claims priority to German Patent Application No. 102020211945.7, filed Sep. 23, 2020, the disclosure of which is incorporated herein by reference in its entirety.

TECHNICAL FIELD

The invention describes a method and arrangement for automatically localizing organ segments in a three-dimensional image, and a medical imaging system.

BACKGROUND

Good knowledge of patient-specific anatomy is important for analyzing diseases and planning therapy. Several organs, e.g. brain, liver and lung, comprise a number of segments, with essentially each segment being functionally and anatomically discrete. In such organs, segment segmentation is helpful for localization of diseases. This enables single segmental resection without affecting neighboring segments, pre-operative assessment during surgery planning, and more informative disease detection combined with functional imaging, e.g. by including functional information of the organ for diagnostics in a displayed segmentation.

The pulmonary anatomy, for instance, is critical for clinical experts to analyze lung-related disease and to plan localized therapy. Pulmonary segments are regarded as the unit respiratory portions of lung, each of which is aerated by a tertiary segmental bronchus. They are sub-regions of the lung lobes. There are eight pulmonary segments in the left lung and ten in the right lung For example, a perfusion defect in a lung observed from SPECT/CT scan can be better associated with pulmonary segments than lung lobes. This may lead to better clinical decisions. The process of manually identifying the pulmonary segments on CT scans is challenging and time consuming because of the large number of pulmonary segments and the fact that the boundaries between segments within each lobe are not visible to the human eye from the image. However, a large number of annotated data sets is required to train an AI-based method that would significantly reduce the effort and computing power.

Given the challenges, there is limited published literature on this topic. One commonly accepted way to identify the pulmonary segments is to investigate the corresponding bronchial segments. Previous attempts have been made to derive the pulmonary segments from bronchial segments, but with high degrees of human interaction and limited accuracy.

BRIEF SUMMARY OF THE INVENTION

It is, therefore, an object of the invention to reduce human effort involved in localizing organ segments in a three-dimensional image.

This object is achieved by the methods; by the arrangements; and by the medical imaging systems disclosed herein.

According to the invention, a method for automatically localizing organ segments in a three-dimensional image comprises the following steps:

providing a three-dimensional image showing at least one organ and at least one tubular network comprising a plurality of tubular structures, the organ comprising organ segments;

performing automatic separation of the organ from other parts of the image;

performing automatic tracing of the tubular network to obtain a branch map;

performing automatic analysis of the branch map to identify specific tubular structures;

performing automatically assigning regions of the organ to the specific tubular structures to segment the organ into localized organ segments; and outputting the localized organ segments and optionally the traced tubular network as image data.

The present invention is described herein to give a visual understanding of methods for localization in medical images. A digital image is often composed of digital representations of one or more objects (or shapes). The digital representation of an object is often described herein in terms of identifying and manipulating the objects. Such manipulations are virtual manipulations typically accomplished in the memory or other circuitry/hardware of a computer system. Accordingly, is to be understood that embodiments of the present invention may be performed within a computer system using data stored within the computer system.

Preferably, the three-dimensional (3D) image is a computer-tomographic (CT) image. However, it should be understood that the 3D image can be a medical image of any suitable modality, such as e.g. MRI, multi-parametric MRI (mpMRI), DynaCT, ultrasound (US), single-photon emission computed tomography (SPECT), positron emission tomography (PET), etc.

The image comprises a representation of a patient's organ, in particular an inner organ, wherein the patient may be a human or an animal. The organ comprises segments, which are—preferably the smallest—elements being essentially functionally and anatomically discrete. This means that a segment is a substantially independent region of the organ which interventional removal or treatment has only minor direct effects on other segments.

The three-dimensional image is an input data set, which is to be analyzed. The image can be directly obtained from an imaging modality used to acquire the medical image or retrieved from a data storage, e.g. a local data memory or network data storage such as the PACS (Picture Archiving and Communication System) or a remote computer or server.

The tubular network comprises a plurality of tubular structures, i.e. it is a system of connected and branching tubes. Each tube has a substantially cylindrical shape, i.e. it can be recognized as a cylinder, although the cylindrical shape may be curved or otherwise deformed. Walls of each tubular structure form the essentially cylindrical shape and enclose a lumen. The tubular network may be part of the organ or closely related to the organ, e.g. blood vessels that permeate and/or surround the organ.

By performing solely automated steps, the organ segments are automatically localized as described in detail in the following. This advantageously reduces human effort. In this context, "automatic" or "automatically" means that although parameters may be set by a user, the actual step or method is performed by machine, in particular algorithmically, without user intervention.

Performing automatic separation of the organ from other, i.e. non-organ, parts of the image means that the organ is segmented from parts that do not anatomically belong to the organ. Such a preparatory segmentation step is generally well known and may be performed with methods such as edge detection, region growing, threshold analysis or the like.

In general, region growing is a well-known segmentation method starting from a seed point. Depending on a region membership criterion, new regions are added to the seed point or the previously determined region. The region membership criterion could be, for example, pixel intensity, grayscale texture, contrast, SNR, or the like. Edge detection generally identifies points in the image at which the image brightness changes sharply or, more formally, has discontinuities.

The automatic tracing detects, in particular, the centerlines of the tubular network. Since the individual tubular structures are connected with each other, a branch map or centerline tree is obtained. The branch map is a substantially tree-like structure, i.e. it comprises a number of branching points or node points in which a branch splits into two or more branches. The centerlines follow the center of the tubular-shaped structure. In particular, the centerline tree or branch map is a three-dimensional representation of the tubular network within the 3D image.

For the automatic tracing step, the original 3D image is preferably used as input. Since the tubular structures have a substantially cylindrical shape techniques such as edge detection, region growing, threshold analysis methods or the like may be adapted to the cylindrical boundary conditions to perform the tracing. In particular, a morphologic tracing algorithm may be performed to obtain the branch map. Since state of the art automatic tracing methods have so far not been able to achieve the accuracy needed for the inventive method and were error prone, the details of the automatic tracing are described below.

Normally, the branch maps of different patients show similar characteristics such as a number of branches starting from a certain node point, the relative direction, i.e. angles, of the branches, the distance between the node points or the like. The automatic analysis of the branch map may be based in particular on these characteristics. Typically, specific tubular structures correspond locally and/or functionally with the organ segments to be segmented in the image data. The automatic analysis of the branch map identifies these specific tubular structures.

Automatically assigning regions of the organ to the specific tubular structures segments the organ into localized organ segments. For instance, starting from each specific tubular structure, region growing or assigning the closest voxels to the respective organ segment segments the organ until it is completely processed into organ segments. This provides the position and extent for each organ segment, i.e. the organ segments are thus localized, in particular, localized in relation to the separated organ or in relation to the 3D image.

The localized organ segments and optionally the traced tubular network are output as image data, i.e. they can be stored, transmitted or displayed. To facilitate the assessment of the imaged organ in the context of the original 3D image, the localized organ segments and optionally the traced tubular network can preferably be output as an overlay with adjustable transparency and additionally or alternatively as separate images.

According to the invention, a localization arrangement for automatically localizing organ segments in a three-dimensional image comprises:

a means for providing a three-dimensional image of an organ comprising organ segments and at least one tubular network comprising a plurality of tubular structures;

a separation means for automatic separation of the organ from other parts of the image;

a tracing means for automatic tracing of the tubular network to obtain a branch map;

an analysis means for automatically analysing the branch map to identify specific tubular structures;

an assignment means for automatically assigning regions of the organ to the specific tubular structures to segment the organ into localized organ segments; and an output for outputting the localized organ segments and optionally the traced tubular structures as image data.

Thus, the localization arrangement comprises all means and is configured to realize the method for automatically localizing organ segments in a three-dimensional image according to the invention. The means for providing a three-dimensional image and the output, for example, may be configured as separate interfaces or one or both of them may be configured as a single integrated interface such as a network interface or the like.

According to the invention, the medical imaging system comprises a localization arrangement according to the invention and an imaging modality.

Some units or modules of the localization arrangement mentioned above can be completely or partially realized as software modules running on a processor of a computing system or a medical imaging system. A realization largely in the form of software modules has the advantage that applications already installed on an existing system can be updated, with relatively little effort, to install and run these units of the present application. The object of the invention is also achieved by a computer program product with a computer program that is directly loadable into the memory of a computing system or of a medical imaging system, and which comprises program units to perform the steps of the inventive method when the program is executed by the medical imaging system or the computing system. In addition to the computer program, such a computer program product can also comprise further parts such as documentation and/or additional components, also hardware components such as a hardware key (dongle etc.) to facilitate access to the software.

A computer readable medium such as a memory stick, a hard-disc or other transportable or permanently installed carrier can serve to transport and/or to store the executable parts of the computer program product so that these can be read by a processor unit of a medical imaging system or a computing system. A processor unit can comprise one or more microprocessors or their equivalents.

Particularly advantageous embodiments and features of the invention are given by the dependent claims, as revealed in the following description. Features of different claim categories may be combined as appropriate to give further embodiments not described herein.

Since the localization of segments according to the invention performs best in organs with distinctive segments and distinguishable tubular structures, the organ to be analyzed is preferably a brain or a liver. More preferably, it is a lung or a pair of lungs. For all these organs, the pathways of the blood vessels are well known and, especially, their correlation with the individual segments of the respective organ. For the lung, in particular, the bronchi form a tubular structure with a strong correlation to the organ segments, as described above.

Accordingly, the tubular structures are preferably blood vessels and/or bronchi. More preferably, if a lung or a pair of lungs is to be analyzed, bronchi as well as blood vessels are used as separate tubular structures for a more complex evaluation based on heuristics for the localization of lung segments.

In case that the organ is a lung, a pre-segmentation into individual lung lobes is preferably performed after or simultaneously to the separation of the lung from the other parts of the image. This segmentation is relatively easy due to the clearly visible indentations of the pleural sac between the lobes of the lungs. Thus, the lung lobes can be segmented with generally known edge detection or region growing methods.

Centerline tracing or extraction can be very challenging due to the thin and unclear tubular structure of smaller airway branches. Due to this structural complexity, the extraction is tedious and time consuming using manual methods. However, since the further steps of the inventive method depend on the accuracy of the branch map, the automatic tracing process is described in detail in the following.

For automatic centerline tracing, a trained AI-based map generation method evaluates the 3D image to generate a tubular structure probability map. A skeletonization algorithm is applied to the tubular structure probability map to obtain the branch map.

The AI-based map generation method is trained by:
receiving medical image data of at least part of a tubular structure,
receiving annotated image data based on the medical image data, wherein the annotated data is a tubular structure probability map,
training the AI-based based map generation method on the medical image data and the annotated data to obtain the trained AI-based map generation method.

In particular, medical image data can be a 3D medical image of at least a part of the tubular structure. In particular, the annotated data can be determined by annotating the medical image data. In particular, a skilled person can manually annotate the medical image data. Manually annotating tubular structures in the medical image data provides high quality and little erroneous annotated data.

Preferably, a pre-training is applied before training the AI-based map generation method with manually annotated data.

The AI-based based map generation method is pre-trained by:
receiving pre-training medical image data of at least a part of a tubular structure,
performing a deterministic algorithm based on a morphology-based segmentation to obtain a pre-training tubular structure probability map,
pre-training the AI-based map generation method based on the pre-training medical image data and the pre-training tubular structure probability map.

In particular, the pre-training medical image data can be the 3D medical image data. In general, suited morphology-based segmentation algorithms are known by a skilled person. Exemplary algorithms which can be used as morphology-based algorithm are for example described by Irving et al. (3D segmentation of the airway tree using a morphology based method, Proceedings of 2nd International Workshop on Pulmonary Image Analysis, p. 297-307, 2009), Feuerstein et al. (Adaptive Branch Tracing and Image Sharpening for Airway Tree Extraction in 3-D Chest CT, Proceedings of 2nd International Workshop on Pulmonary Image Analysis, p. 273-284, 2009), Lo et al. (Multiscale Vessel-guided Airway Tree Segmentation, Proceedings of 2nd International Workshop on Pulmonary Image Analysis, p. 323-332, 2009), and Bauer et al. (Airway Tree Reconstruction Based on Tube Detection, Proceedings of 2nd International Workshop on Pulmonary Image Analysis, p. 203-213 2009).

Even if the pre-training tubular structure probability map is not as precise (especially in the smaller parts of the tubular structures) as the manually annotated data, it can be used for pre-training the AI-based based map generation method. The pre-trained function can be fine-tuned by a second training step using the manually annotated data. Thus, a large number of pre-training tubular structure probability maps can be used for pre-training the AI-based based map generation method. In this manner, it is possible to train and fine-tune the AI-based based map generation method with a small amount of manually annotated data.

The skeletonization algorithm serves to determine the branch map of the tubular network or the tubular structures within the 3D image. The branch map or centerline tree can be calculated by applying the skeletonization algorithm to the tubular structure probability map. In particular, the skeletonization algorithm can be configured to ensure a curved smoothness and/or connectivity of the branch map, and can deal with background noise. Curved smoothness means that the branch map follows the organic shape of the tubular structures. Connectivity means that there are no gaps in the branch map of the tubular structures depicted in the 3D medical image. The connectivity of the tubular structures is always present in a human being to enable flow, e.g. the air or blood flow. Dealing with background noise means that the skeletonization algorithm recognizes that noise does not correspond to the tubular structures. A skeletonization algorithm with these properties can e.g. be based on an adaption of the Rivulet algorithm. Such an adaption is described by Siqi et al. ("Automated 3-D Neuron Tracing With Precise Branch Erasing and Confidence Controlled Back Tracking", IEEE Transactions on Medical Imaging, Vol. 37, No. 11: 2441-2452, 2018).

The automatic centerline tracing is performed for each type of tubular network, e.g. blood vessels and bronchi, separately. Due to different characteristics of different types of tubular networks, for each tubular network the AI-based map generation method is trained separately.

Thus, the centerlines can automatically be traced and the branch map is obtained with high accuracy based on the 3D medical image data.

Analyzing the branch map is preferably based on heuristics of the topology of the tubular network. As mentioned above, the characteristics of the topology of the tubular network may comprise, e.g. a number of branches starting from a certain node point, a relative direction, i.e. angles, of the branches, the distance between the node points or the like. These characteristics are similar for different patients and even their standard deviations are known or may be determined empirically. Based on this data, a heuristic evaluation of the branch map can be performed.

Alternatively, it is preferred to analyze the branch map based on deformable registration and atlas propagation.

Deformable image registration (DIR) is also known as non-rigid image registration. In rigid image registration (RIR), all pixels move and/or rotate uniformly so that every pixel-to-pixel relationship remains the same before and after transformation. In DIR, however, those pixel-to-pixel relationships change in order to achieve a better match after the transformation. Additionally, this embodiment is based on so-called atlases consisting of an image of the respective organ and corresponding labels that have been prepared in advance, e.g. using detailed manual segmentation. The registration of the 3D image and the atlas provides an indication in form of a specific label for each tubular structure in the 3D image. Thus, it is possible to identify the specific tubular structures.

More preferably a multi-atlas propagation is performed. This means that a number of atlas propagations as described above is performed and different results of the labels for each tubular structure are averaged or weighted and averaged. Thus, it is possible to identify the specific tubular structures more reliably.

In a preferred and resource-saving embodiment of the invention, the regions of the organ are assigned voxel-wise to the closest specific tubular structure. This means each voxel of the organ is assigned to the specific tubular structure with the minimum distance.

In an alternative embodiment, assigning regions of the organ to the specific tubular structures is based on region growing. In this case, the seed points for the region growing are the specific tubular structures. The region growing is performed stepwise. If a conflict arises, i.e. in a step, a region is to be added to two or more different segments, the region may be added to the most similar segment or divided between the segments.

Both alternative embodiments mentioned above are performed until the complete organ is assigned to the segments starting from the respective specific tubular structure. The voxels on the boundary between two or more segments can preferably be re-evaluated in an optional surface smoothing step for the segments.

In few cases, both above-mentioned alternatives for the assignment of the regions might not lead to anatomically accurate results due to the presence of inconclusive features in the image. Thus, a spatially registered anatomical template preferably constrains the assignment of regions of the organ to the specific tubular structures. The registration may be performed as rigid or non-rigid registration as described above. Similar to the atlas described above, the template is, for example, a map with designated regions for each organ segment, which overlap if necessary. An image region may only be assigned to an organ segment if it corresponds to the respective designated region. Alternatively, the template may be designed, for example, as a probability map and may set "soft" boundaries for designated regions for each organ segment. In case of doubt, an image region is assigned to the organ segment with the higher probability.

Preferably, at least one of the steps of automatic separation, automatic tracing, automatic analysis, and automatic assignment is performed by a trained AI-based method. More preferably, all of the steps are performed by a trained AI-based method.

The term AI-based method means a machine method that mimics cognitive functions associated with the human mind. The term includes e.g. machine learning and deep machine learning. In particular, by training based on training data the trained AI-based method is able to adapt to new circumstances and to detect and extrapolate patterns.

The AI-based method is preferably a machine learning method, more preferably a deep machine learning method. In general, machine learning enables the machine to adapt to new circumstances and to detect and extrapolate patterns. "Simple" or "traditional" machine learning methods comprise e.g. logistic regression, support vector machine (SVM), random forest or the like.

In general, parameters of the AI-based method can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained AI-based method can be adapted iteratively by several steps of training.

In particular, by training based on training data the trained AI-based method is able to adapt to new circumstances and to detect and extrapolate patterns. Preferably, the mostly deterministic algorithms described above can generated the necessary training data automatically. Since the described deterministic algorithms perform with sufficient accuracy, no or almost no manual annotated training data is needed.

In other words, using a plurality of input data sets, each input data set is processed by the mostly deterministic algorithm to obtain training data. It the input data is also processed by the untrained AI-based method. Using a large number of input data sets the AI-based method is trained by adjusting the AI-based method to minimize the deviations between the training data and the result of the AI-based method to be trained.

For example, if the step of automatic tracing is to be implemented as trained AI-based method, a plurality of 3D images serves as input data sets. The 3D images are processed by the untrained AI-based method to obtain a result. The 3D images are also processed by the mostly deterministic tracing algorithm to obtain training data in form of a branch map, which is compared to the result of the AI-based method to train the AI-based method.

Furthermore, the mostly deterministic algorithms can generate the input data needed for the training of the AI-based method. For example, if the step of automatic analysis is to be implemented as AI-based method, a plurality of branch maps is needed as input data sets. These can be generated by performing the automatic tracing on a plurality of 3D images with the mostly deterministic algorithm. Starting with the input data sets thus obtained, the training described above is performed.

Thus, each of the steps of automatic separation, automatic tracing, automatic analysis, and automatic assignment can be implemented as a trained AI-based method and therefore any suitable combination or all of the steps can be implemented in a single trained AI-based method.

In particular, the trained AI-based method can comprise a neural network, a support vector machine, a decision tree and/or a Bayesian network, and/or the trained AI-based method can be based on k-means clustering, Q-learning, genetic algorithms and/or association rules. In particular, a neural network can be a deep neural network, a convolutional neural network or a convolutional deep neural network. Furthermore, a neural network can be an adversarial network, a deep adversarial network and/or a generative adversarial network.

Preferably, the trained AI-based method comprises a dense unit network. In particular, the dense unit network comprises a convolutional layer, a max pooling layer and a deconvolutional layer. In particular, the dense unit network comprises a first part and a second part. In the first part of the dense unit network, the input data is down-sampled. Down-sampled means that the dimension of the input data is reduced, i.e. the number of pixels or voxels of the input data is reduced. The input data can be the 3D image. In the second part of the network, the down-sampled data is up-sampled again such that the output data comprises the same format as the input data. That means there is a one-to-one correspondence between nodes of the input layers and nodes of the output layers, in particular, also with respect to the numerical values they can represent. If the input data is the 3D image, the output data having the same size means that the output data is also a 3D image of the same dimensionality as the input 3D image, and comprising the same number of pixels or voxels with respect to each dimension.

Furthermore, layers of the dense unit network are concatenated. For example, the last layer can be concatenated with the first layer of the dense unit network. In other words, the last layer can receive information from the first layer. A detailed description of a dense unit network is for example provided by Çiçek et al., "3D U-Net: Learning Dense Volumetric Segmentation from Sparse Annotation" (MICCAI, Springer, Vol. 9901: 424-432, 2016).

The term "network" indicates here that there could be a physical network, i.e. a network of physical nodes connected by signal lines (e.g. a FPGA or a network of physical computing devices). However, the term also means that there could be a virtual network based on virtual nodes (e.g. virtual neurons) connected by virtual signal lines (e.g. nodes linked with each other). Thus, the deep learning network could be present as physical (hardware) network in the form of a hardware module or as a virtual network in form of a software module, wherein the software module can be present in an individual (hardware) computing module.

In the case of a virtual network, there are often artificial neurons present as elementary units in the network. An artificial neuron is a mathematical function conceived as a model of a biological neuron, receiving one or more inputs that could e.g. represent excitatory postsynaptic potentials and inhibitory postsynaptic potentials at neural dendrites, and sums them to produce an output. Usually each input is separately weighted, and the sum is passed through a non-linear function known as an "activation function" (or "transfer function"). A preferred activation function has a sigmoid shape, but it may also take the form of other non-linear functions, piecewise linear functions, or step functions.

The deep learning network may have a well-known basic architecture. However, its inner structure and its performance is individually shaped after the training. Thus, it can be said that the training defines the inner "structure" of the deep learning network and distinguishes it from other trained deep learning networks (even of the same basic architecture).

Within its training phase, the weights or parameters within its structure are automatically adjusted to resemble the training data. For the optimization of the weights/parameters of all layers, well-known optimization approaches, e.g. a gradient descent algorithm or a Adam algorithm in combination with e.g. the cross entropy loss function, can be used.

After the training, the weights/parameters of the network are adapted for the specific task and can e.g. trace the centerlines of the tubular network to obtain a branch map, analyze the branch map to identify specific tubular structures, assign regions of the organ to the specific tubular structures to segment the organ into localized organ segments from previously unseen measurements.

The components of the medical imaging system are preferably part of a data-network, wherein the data-network and an imaging modality which provides image data are in data-communication with each other, wherein the data-network preferably comprises parts of the internet and/or a cloud-based computing system, wherein preferably the device according to the invention or at least the deep learning network is realized in this cloud-based computing system. For example, the components of the device are part of a data-network, wherein preferably the data-network and a medical imaging modality, which provides the image data, are in communication with each other. Such a networked solution could be implemented via an internet platform and/or in a cloud-based computing system.

The method may also preferably include elements of "cloud computing". In the technical field of "cloud computing", an IT infrastructure is provided over a data-network, e.g. a storage space or processing power and/or application software. The communication between the user and the "cloud" is achieved by means of data interfaces and/or data transmission protocols.

Provision of data preferably takes place via a data channel (for example a data-network) to a "cloud". This "cloud" includes a (remote) computing system, e.g. a computer cluster that typically does not include the user's local machine. This cloud can be made available in particular by the medical facility, which also provides the medical imaging systems. In particular, the image acquisition data is sent to a (remote) computer system (the "cloud") via an RIS (Radiology Information System) or a PACS (Picture Archiving and Communication System). The above-mentioned units, especially the dense network(s), are preferably present on the "cloud" side. A preferred localization arrangement further comprises, a local computing unit connected to the device via a data channel (e.g. a data-network, particularly configured as RIS, PACS). The local computing unit includes at least one data receiving interface to receive data. Moreover, it is preferred if the local computer additionally has a transmission interface in order to send data to the device.

Preferably, the 3D image is preprocessed to address or remove variability or variances between the 3D image and the training data before being evaluated by a localization arrangement. Removing variances between the 3D image and the training data ensures a high level of performance even with limited data availability. Such variances may include geometric variances, intensity variances, variances in the ground truth preparation, or any other variance.

Geometric variability is preferably addressed to properly align the 3D image for accurate and efficient reading. In particular, a registration step is performed to align the 3D image. In addition, to obtain uniform dimensionality and voxel spacing of the images across modalities and patient cases, each image is preferably transformed to a space with identical dimensions and spacing. Thus, by removing geometric variability, each 3D image will have the same size, orientation, spacing, and position properties.

To ensure intensity comparability across patient cases and different modalities, the intensities of the images are preferably normalized. The normalization may be based on a median, average, or any other statistically robust metric, such as, e.g., an average of the middle two quartiles of an intensity histogram.

The three-dimensional image is preferably an MR image or ultrasonic image. More preferably, it is a CT image. All these modalities are well known in 3D imaging and therefore well suited for the inventive method.

Other objects and features of the present invention will become apparent from the following detailed descriptions considered in conjunction with the accompanying drawings. It is to be understood, however, that the drawings are designed solely for the purposes of illustration and not as a definition of the limits of the invention.

DETAILED DESCRIPTION

Figure 1:
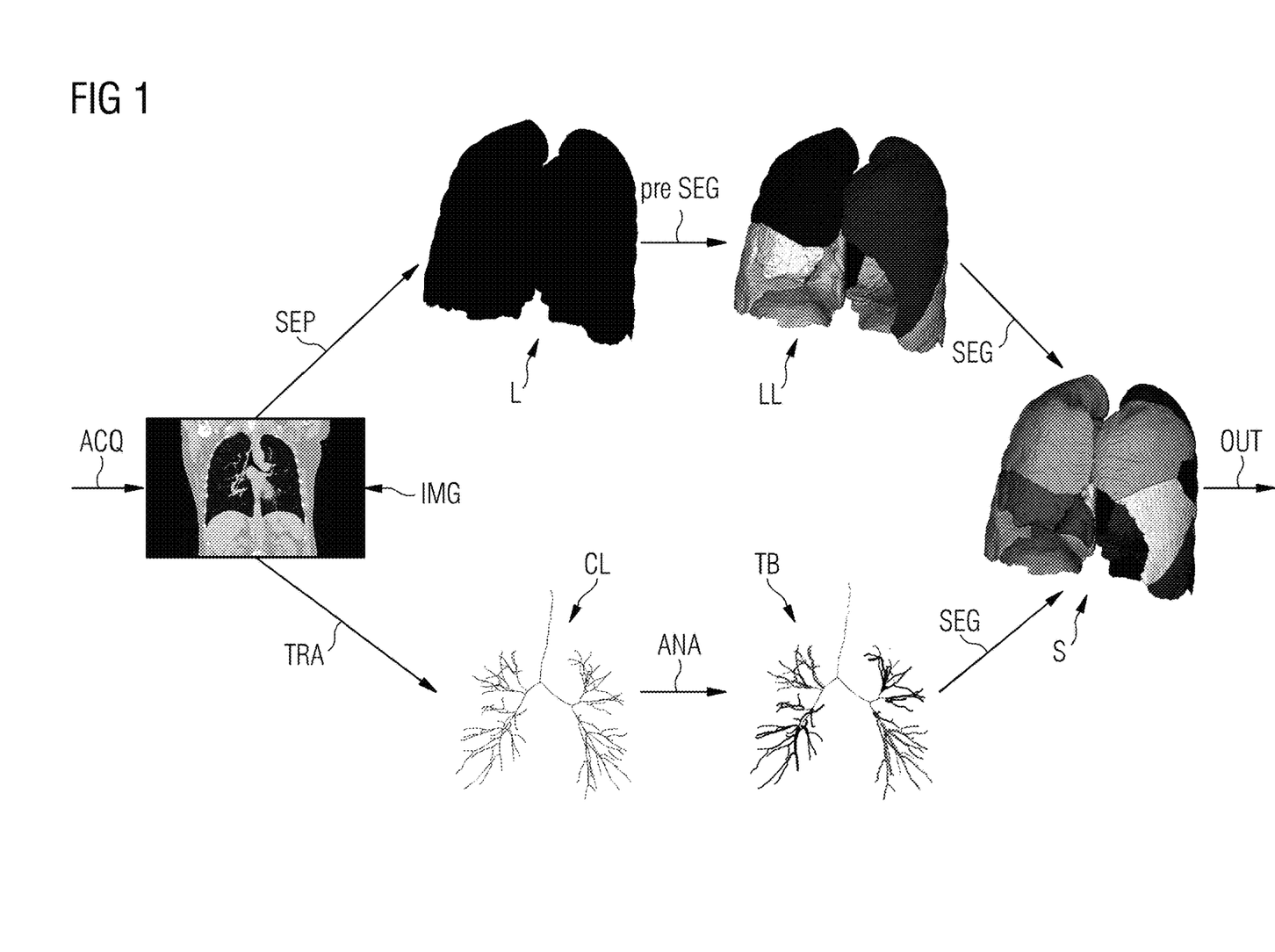
FIG. 1 shows an exemplary block diagram of a first embodiment of the inventive method.
Figure 2:
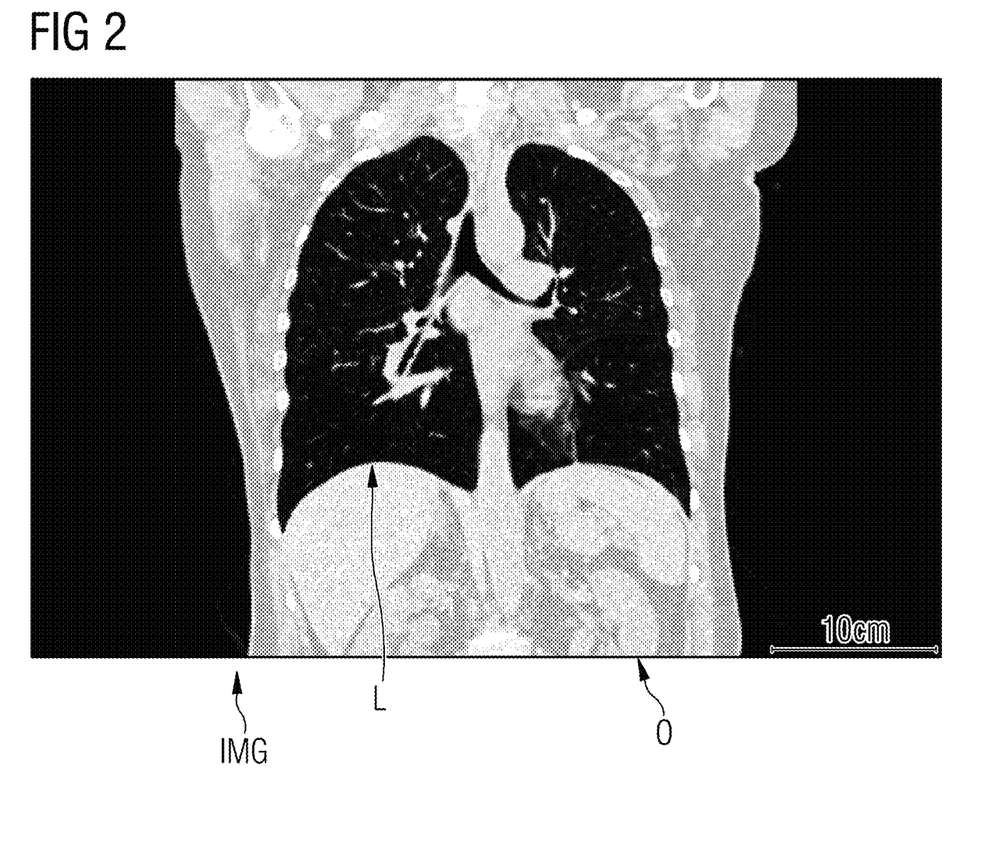
FIG. 2 shows an exemplary CT image of a patient's thorax region as a sectional view of a 3D image.
Figure 3:
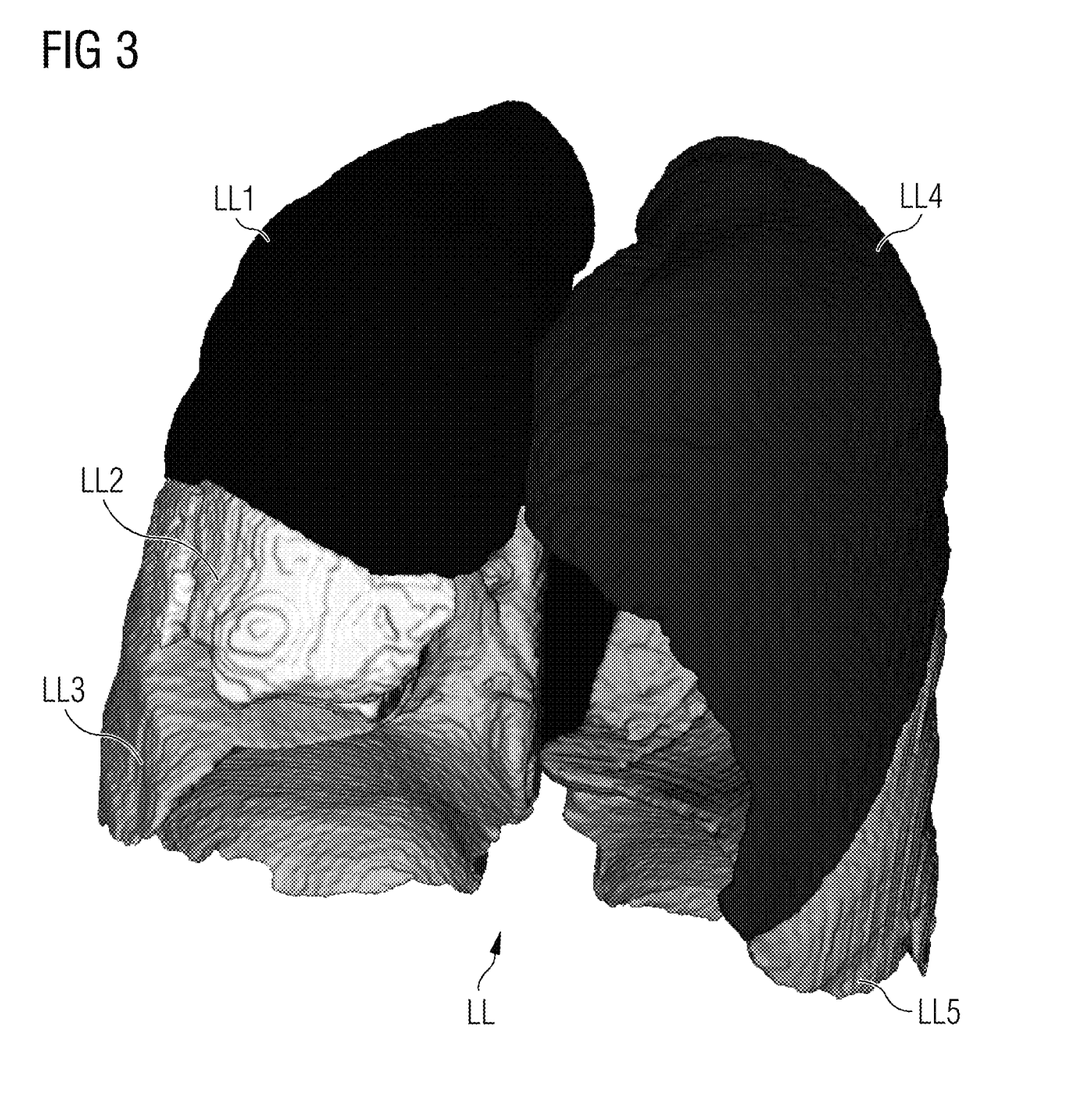
FIG. 3 shows a detailed image of a separated and pre-segmented lung.
Figure 4:
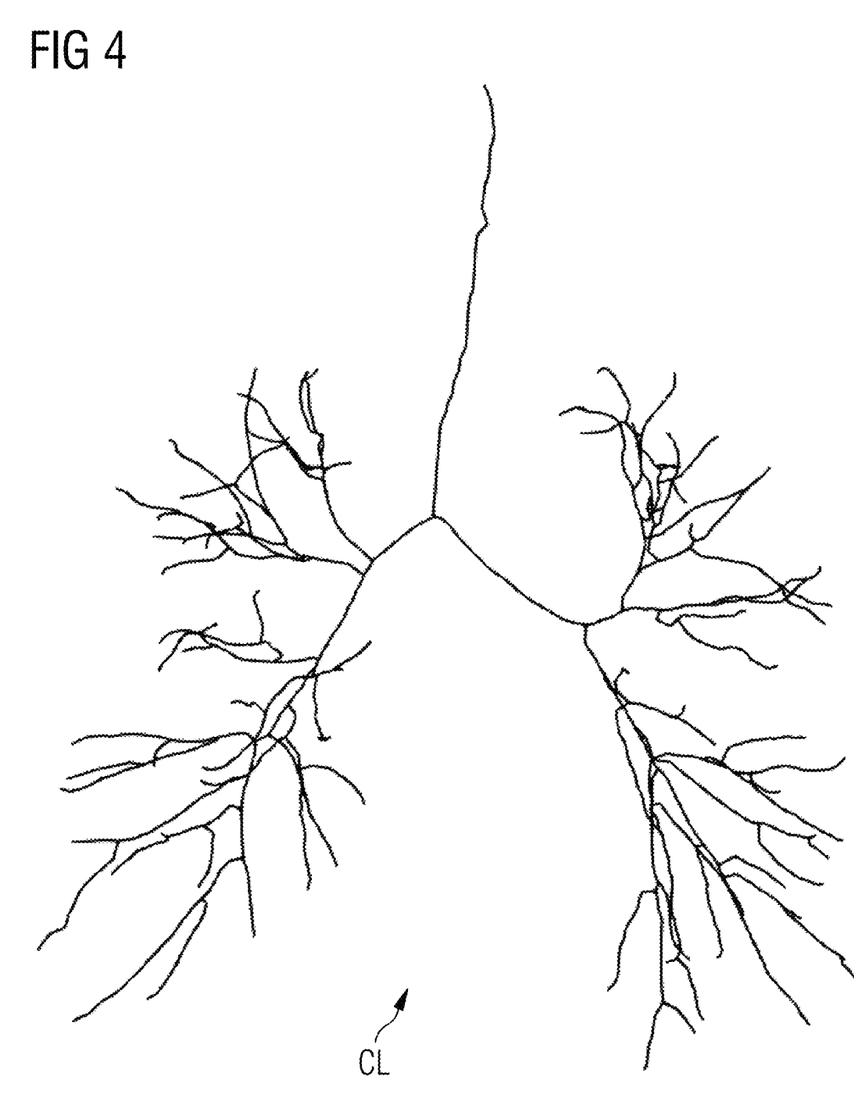
FIG. 4 shows a detailed image of traced centerlines of airways.
Figure 5:
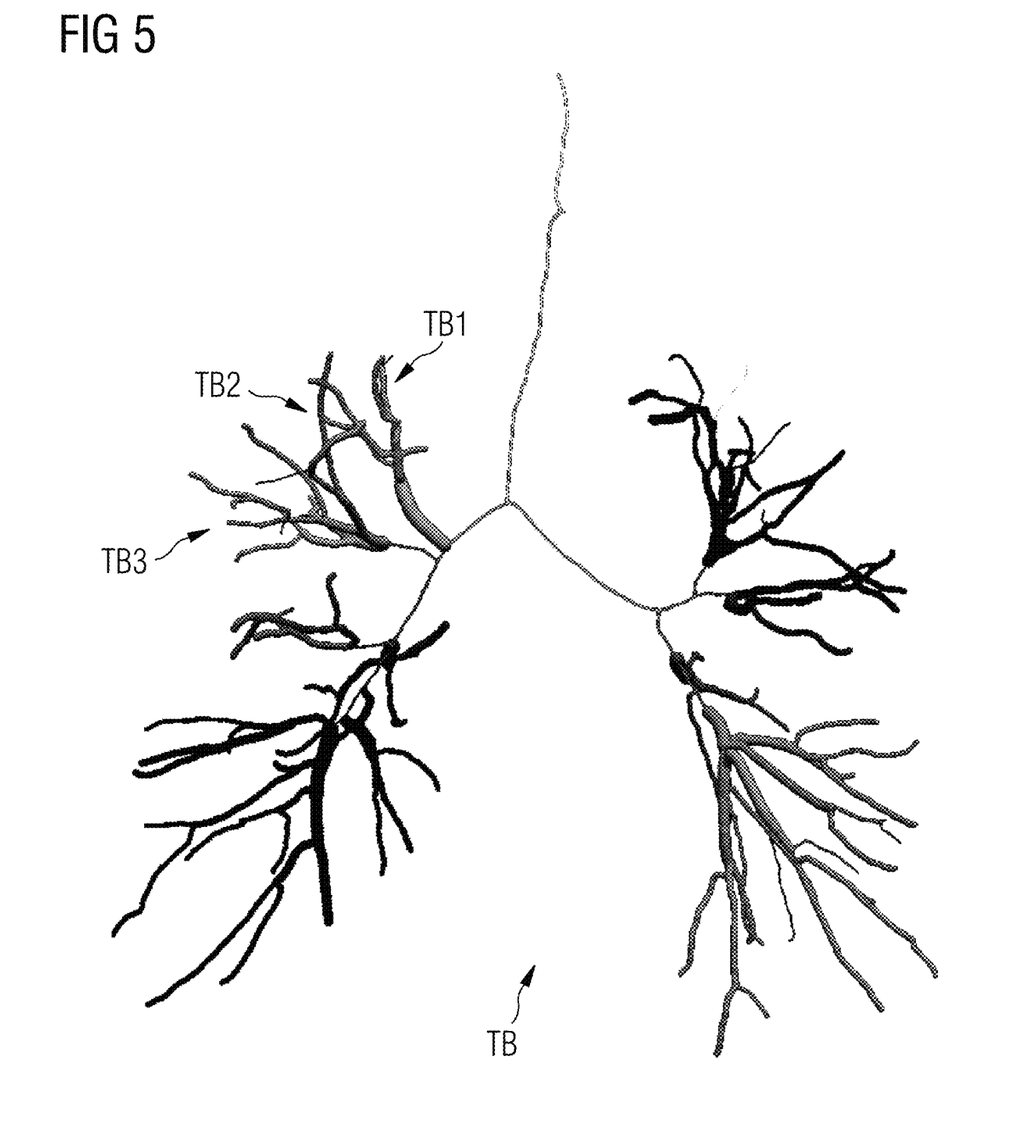
FIG. 5 shows a detailed image of analysed specific bronchi.
Figure 6:
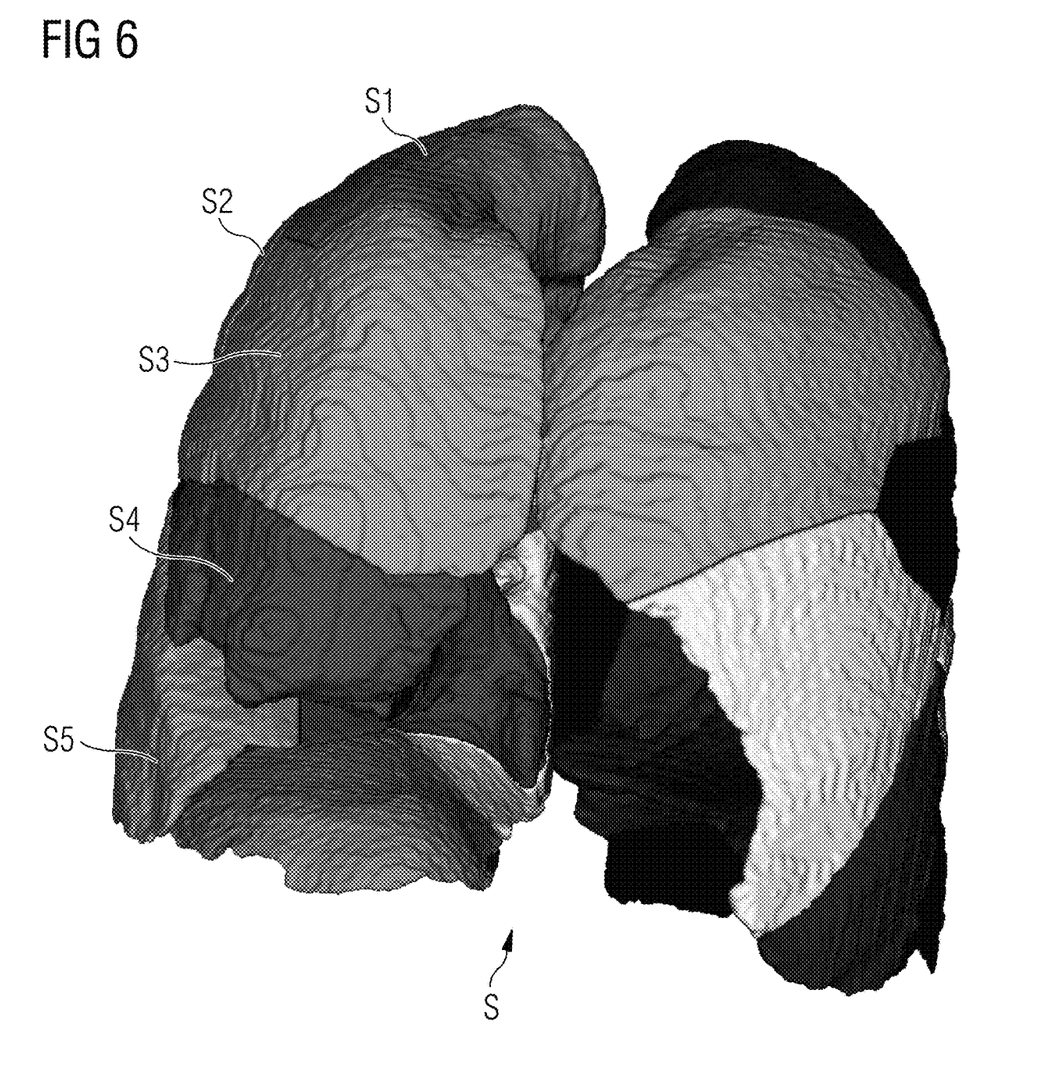
FIG. 6 shows a detailed image of a lung and its lung segments.

FIG. 1 shows a schematic diagram of an exemplary embodiment of the inventive method for automatically localizing organ segments S in a three-dimensional (3D) image IMG. For the description of some steps, reference is made to the detailed illustrations in FIGS. 2-6. The references of the individual image components in FIG. 3, FIG. 5 and FIG. 6 are for illustrative purposes only and do not necessarily correspond to the common anatomic nomenclature.

In a step ACQ, a medical 3D image IMG in form of a reconstructed CT image is received, e.g. from an internal or local storage, a network storage or a cloud system or directly acquired with an imaging modality such as a CT scanner. It is apparent that alternatively any appropriate medical 3D image can be used, e.g. an MR image or an ultrasonic image. The 3D image IMG is represented by a sectional view of a thorax region of a patient O (see FIG. 2). Thus, it comprises a view of two lungs L of the patient O.

In a step SEP, the lungs L are automatically separated from other parts, i.e. non-lung tissue, of the 3D image IMG. In a step preSEG, an optional automatic pre-segmentation of the lung L into lung lobes LL is performed. The result of the pre-segmentation, i.e. the individual lung lobes LL1, LL2, LL3, . . . , are shown in in FIG. 3. Since both the lung L as a whole and the lung lobes LL are separated by the lung sac and can therefore be clearly distinguished, well-known segmentation algorithms using edge detection, region growing, threshold analysis and/or the like can perform the steps of automatic separation SEP and automatic pre-segmentation preSEG.

The lungs L comprise airways such as bronchi TB1, TB2, TB3, . . . being tubular structures, i.e. they are substantially cylindrical in shape. The airways are connected and therefore form a tubular network TB. In a step TRA, this tubular network TB is automatically traced and a branch map CL is obtained which depicts the centerlines of the airways. For this purpose, a trained AI-based map generation method that evaluates the 3D image IMG generates a probability map for the airways TB. In particular, the AI-based map generation method is trained as described above. A skeletonization algorithm is applied to the tubular structure probability map to obtain the branch map CL of the airway centerlines (see FIG. 4). In particular, the skeletonization algorithm is implemented as described above in context with the Rivulet algorithm.

In a step ANA, the branch map CL is automatically analyzed and specific bronchi, more precisely specific tertiary bronchi TB1, TB2, TB3, . . . , are determined. For the automatic analysis ANA, an atlas propagation algorithm is applied. To this end, an atlas comprising a labeled map of specific bronchi TB1, TB2, TB3, . . . , is provided and registered as a template to the branch map using deformable registration. From the registered atlas, the specific bronchi TB1, TB2, TB3, . . . , can be determined directly (see FIG. 5).

The specific tertiary bronchi TB1, TB2, TB3, . . . correspond to the respective lung segments. In a step SEG, regions of the separated and optionally pre-segmented lung L are assigned to the specific tertiary bronchi TB1, TB2, TB3, . . . to segment the lung L into lung segments S1, S2, S3, . . . . In the same process, the lung segments S1, S2, S3, . . . are localized in relation to the separated lung L or in relation to the 3D image IMG (see FIG. 6).

Assigning regions of the lung L is, e.g., performed by a generally known region growing algorithm starting from the specific tertiary bronchi TB1, TB2, TB3, . . . as seed points. In case that the optional automatic pre-segmentation preSEG was performed, region growing is only performed until the boundary of a lung lobe LL is reached. In case that the optional automatic pre-segmentation preSEG was not performed, region growing is performed until the boundary of the lung L is reached. The region growing algorithms is preferably slightly modified to include an additional template which is registered to the separated lung L or the pre-segmented lung lobes LL. The template specifies limits for the expansion of the lung segments S1, S2, S3, . . . .

In a step OUT, the segmented and localized lung segments S1, S2, S3, . . . are output as image data, i.e. they are e.g. stored, transmitted or displayed. To facilitate the assessment of the imaged lung, the original 3D image IMG, the localized lung segments S1, S2, S3, . . . and the original 3D image IMG can preferably be output as an overlay with adjustable transparency and additionally or alternatively as separate images. Optionally also the traced tubular network CL and/or the specific tertiary bronchi TB1, TB2, TB3, . . . can preferably be output as an overlay with adjustable transparency and additionally or alternatively as separate images.

Figure 7:
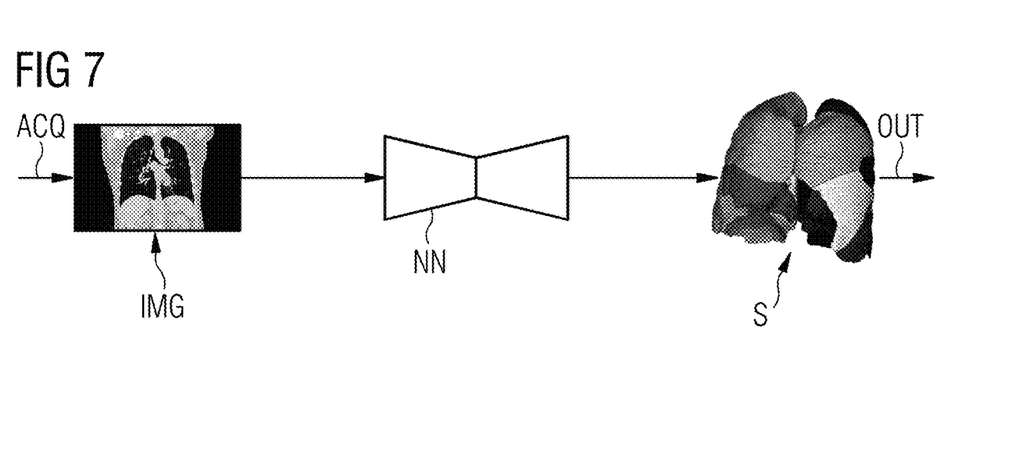
FIG. 7 shows an exemplary block diagram of a second embodiment of the inventive method.

FIG. 7 shows a schematic diagram of another exemplary embodiment of the inventive method for automatically localizing organ segments S in a three-dimensional (3D) image IMG. Compared to the embodiment referring to FIG. 1, here, the steps of automatically separating SEP the lung L from other parts of the 3D image IMG; automatically pre-segmenting preSEG the lung L; automatically tracing TRA the airways TB; automatically analyzing ANA the branch map CL; and automatically assigning SEG region of the lung L to specific tertiary bronchi TB1, TB2, TB3, . . . are all implemented as a single trained neuronal network NN. The output of the trained neuronal network NN can be designed as described above referring to FIG. 1.

The trained neuronal network NN is preferably configured as a dense neural network or as a fully connected neural network. It is preferably trained at least in part with training data provided by the inventive method as described with reference to FIG. 1. Compared to the error-prone, if possible, manual annotation of training data for this purpose the use of the method described referring to FIG. 1 allows fast and accurate generation of training data. Thus it is possible to train the neural network NN with a sufficient number training data sets.

Figure 8:
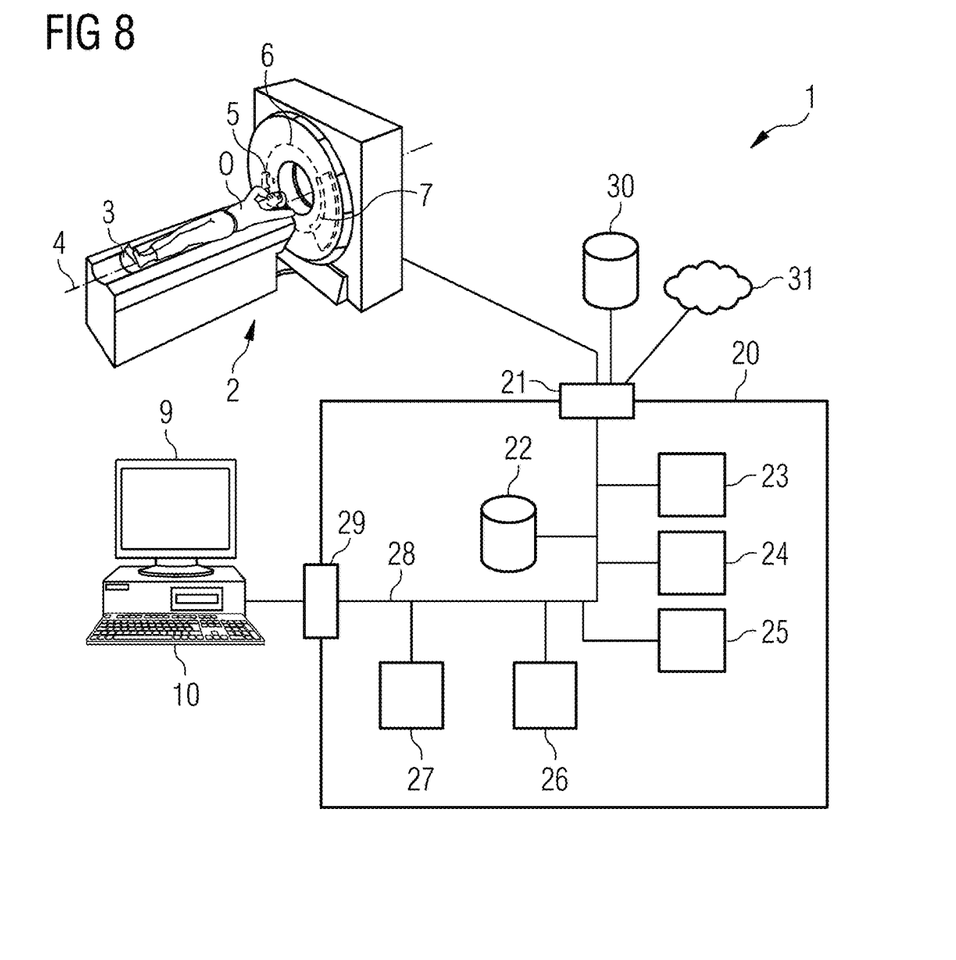
FIG. 8 shows a simplified example of an inventive medical imaging system comprising an example of an inventive localization arrangement.

FIG. 8 shows a schematic representation of a medical imaging system 1 as a CT system 1. The CT system 1 includes an actual CT scanner 2, i.e. an imaging modality. The CT scanner 2 comprises a patient table 3 for positioning a patient O as an examination object. The patient table 3 is adjustable along a system axis 4 into the measuring field and, thus, positions the patient O in the measuring field. The CT scanner 2 further comprises a gantry 6 with an arrangement of a radiation source 5 and a detector 7, which is mounted to be rotatable around a system axis 4. The radiation source 5 and the detector 7 are aligned opposite to each other in such a way that, during operation, X-rays emanating from the focus of the X-ray radiation source 5 impinge on the radiation detector 7 after permeating the patient O. To take an image of a region of interest, projection data from a variety of different projection directions are acquired by rotating the radiation source 5 and the detector 7. For each projection, the radiation detector 7 generates a set of projection data. These projection data are then further processed to form a resulting 3D image IMG.

In general, the skilled person is familiar with the design and function of a CT scanner as well as the reconstruction of CT images. For this reason, a more detailed description is omitted.

Furthermore, the CT system 1 comprises a localization arrangement 20, keyboard 10 for user input and a screen 9 for displaying information. The localization arrangement 20 is connected to the keyboard 10 and the screen 9 via a second input/output interface 29 and to the CT scanner 2 via a first input/output interface 21. The CT scanner 2 provides CT images, preferably comprising a thorax region of a patient O, as three-dimensional image data IMG. Additionally the localization arrangement 20 is connected to an external storage 30, for example, storage of a hospital internal Picture Archiving and Communication System (PACS) that can provide the 3D image IMG. A further connection is established via the input interface 21 to a cloud storage 31 that can provide the 3D image IMG.

The localization arrangement 20 further comprises a separation means 23 for performing the step SEP; a tracing means 25 for performing the step TRA; an analysis means 26 for performing the step ANA; and an assignment means 27 for performing the step SEP. The components of the localization arrangement 20 are connected via a data connection 28, that may have the form of a bus or a network connection.

The processed image data can be output via the second input/output interface 29 to the screen 9 or via the first input/output interface 21 to an external storage 30 or to the cloud storage 31. Alternatively, the output data of the inventive method can be stored on an internal storage 22 of the localization arrangement.

It is to be understood that the components of the CT system 1 and/or the localization arrangement 20 can be spatially distributed in a cloud-based system. Alternatively, the localization arrangement 20 can be designed integrally in the CT scanner 1 or its image reconstruction unit. The function of the localization arrangement 20 has been explained in more detail with respect to the method shown in FIG. 1.

Although the present invention has been disclosed in the form of preferred embodiments and variations thereon, it will be understood that numerous additional modifications and variations could be made thereto without departing from the scope of the invention. For example, blood vessels may serve as tubular network or tubular structure as alternative or in addition to the airways. Furthermore, the method can be applied to other organs such as liver or brain with minor modifications. For the sake of clarity, it is to be understood that the use of "a" or "an" throughout this application does not exclude a plurality, and "comprising" does not exclude other steps or elements. The mention of an "arrangement" or a "system" does not preclude the use of more than one unit or device and does not preclude a spatial distribution of the components e.g. in a network or a cloud system.

The invention claimed is:

1. A method for automatically localizing organ segments in a three-dimensional image comprising:
providing a three-dimensional image showing at least one organ and at least one tubular network comprising a plurality of tubular structures, the organ comprising organ segments;
performing automatic separation of the organ from other parts of the image;
performing automatic tracing of the tubular network to obtain a branch map;
performing automatic analysis of the branch map to identify specific tubular structures;
performing automatically assigning voxels of the organ to a closest one of the specific tubular structures to segment the organ into localized organ segments; and
outputting the localized organ segments, the branch map, and/or analyzed tubular network as image data.

2. The method according to claim 1, wherein the organ is a lung or a pair of lungs, a brain or a liver.

3. The method according to claim 1, wherein the tubular structures are bronchi and/or blood vessels.

4. The method according to claim 1, wherein the step of performing automatic analysis of the branch map is based on heuristics of a topology of the tubular network.

5. The method according to claim 1, wherein the step of performing automatic analysis of the branch map is based on deformable registration and atlas propagation of the branch map.

6. The method according to claim 1, wherein a spatially registered anatomical template constrains the assignment of the voxels of the organ to the closest one of the specific tubular structures.

7. The method according to claim 1, wherein at least one of the steps of performing automatic separation, performing automatic tracing, performing automatic analysis, and performing automatically assigning is performed by a trained AI-based method.

8. The method according to claim 1, wherein all of the steps of performing automatic separation, performing automatic tracing, performing automatic analysis, and performing automatically assigning are performed by a trained AI-based method.

9. The method according to claim 1, wherein the three-dimensional image is a CT image, an MR image or ultrasonic image.

10. A localization arrangement for automatically localizing organ segments in a three-dimensional image comprising:
a means for providing a three-dimensional image of an organ comprising organ segments and at least one tubular network comprising a plurality of tubular structures;
a separation means for automatic separation of the organ from other parts of the image;

a tracing means for automatic tracing of the tubular network to obtain a branch map;

an analysis means for automatic analysis of the branch map to identify specific tubular structures;

an assignment means for automatic assignment of voxels of the organ to a closest one of the specific tubular structures to segment the organ into localized organ segments; and an output for outputting the localized organ segments, the branch map and/or analyzed tubular network as image data.

11. The localization arrangement according to claim 10, wherein the organ is a lung or a pair of lungs, a brain or a liver.

12. The localization arrangement according to claim 10, wherein the tubular structures are bronchi and/or blood vessels.

13. The localization arrangement according to claim 10, wherein the step of performing automatic analysis of the branch map is based on heuristics of a topology of the tubular network.

14. The localization arrangement according to claim 10, wherein the step of performing automatic analysis of the branch map is based on deformable registration and atlas propagation of the branch map.

15. A medical imaging system comprising the localization arrangement according to claim 10 and an imaging modality.

16. A non-transitory computer readable medium storing computer program instructions for automatically localizing organ segments in a three-dimensional image, the computer program instructions when executed by a processor cause the processor to perform operations comprising:

providing a three-dimensional image showing at least one organ and at least one tubular network comprising a plurality of tubular structures, the organ comprising organ segments;

performing automatic separation of the organ from other parts of the image;

performing automatic tracing of the tubular network to obtain a branch map;

performing automatic analysis of the branch map to identify specific tubular structures;

performing automatically assigning voxels of the organ to a closest one of the specific tubular structures to segment the organ into localized organ segments; and outputting the localized organ segments, the branch map, and/or analyzed tubular network as image data.

* * * * *